3,149,159
SUBSTITUTED 7-AMINOALKYLBICYCLO-
[4.2.0]OCTA-1,3,5-TRIENES
Carl Kaiser, Haddon Heights, N.J., and Charles L. Zirkle, Berwyn, Pa., assignors to Smith Kline & French Laboratories, Philadelphia, Pa., a corporation of Pennsylvania
No Drawing. Filed Apr. 16, 1962, Ser. No. 187,915
8 Claims. (Cl. 260—570.8)

This invention relates to substituted 7-aminoalkylbicyclo[4.2.0]octa-1,3,5-trienes. The ring system is also designated as benzocyclobutene.

The novel compounds of this invention are useful as anorectic and hypotensive agents. A particular advantage of these compounds is their lack of amphetamine-like side effects.

More specifically, the novel 7-aminoalkylbicyclo[4.2.0]octa-1,3,5-trienes of this invention are represented by the following fundamental structural formula:

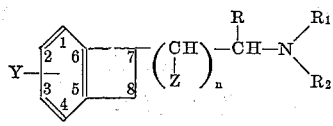

FORMULA I when:

R represents lower alkyl;
$R_1$, $R_2$ and Z represent hydrogen or lower alkyl;
$n$ represents a positive integer from 0 to 1; and
Y represents hydrogen, halogen of atomic weight less than 80 such as chlorine, bromine or fluorine, lower alkyl, lower alkoxy or trifluoromethyl.

Each of said lower alkyl or lower alkoxy moieties is of from 1 to 3 carbon atoms, such as methyl, ethyl and the like.

The Y-substituent in Formula I is preferably in position 3 of the benzene ring.

Advantageous compounds of this invention are represented by the following structural formula:

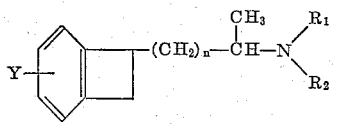

when:

$R_1$ and $R_2$ represent hydrogen or methyl;
$n$ represents 0 or 1; and
Y represents hydrogen, chlorine, methyl, methoxy or trifluoromethyl, preferably in position 3.

This invention also includes acid addition salts of the above defined bases formed with nontoxic pharmaceutically acceptable organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methanesulfonic, ethanedisulfonic, cyclohexyl sulfamic, acetic, propionic, tartaric, salicylic, citric, gluconic, lactic, malic, mandelic, cinnamic, citraconic, aspartic, stearic, palmitic, itaconic, glycolic, p-aminobenzoic, glutamic, benzene sulfonic and theophylline acetic acids as well as with the 8-halotheophyllines, for example 8-bromotheophylline. Exemplary of such inorganic salts are those with hydrochloric, hydrobromic, sulfuric, sulfamic, phosphoric and nitric acids. Of course these salts may also be prepared by the classical method of double decomposition of appropriate salts which is well-known to the art.

The compounds of this invention may be present as d, 1 optical isomers. Unless otherwise specified, it is intended to include in the specification and the accompanying claims the resolved d- or 1-isomers as well as the racemic mixture of these isomers.

In general, the compounds of this invention are prepared from bicyclo[4.2.0]octa-1,3,5-trienes having a 7-carboxylic acid substituent which is converted to a carbonyl group, followed by introduction of a potential amino group. More specifically, the compounds of Formula I where $n$ is 0 are prepared as shown in the following general reaction sequence illustrated for $R_1$ and $R_2$ both hydrogen:

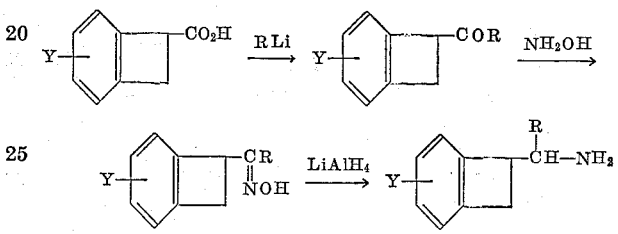

Thus, the bicyclo[4.2.0]octa-1,3,5-triene-7-carboxylic acid is reacted with an alkyl lithium in an ether-type solvent to give the 7-carbonyl derivative which is treated with hydroxylamine hydrochloride in an aqueous lower alkanolic solution to form the corresponding hydroxylimine derivative. The latter compound is then reduced with preferably a bimetallic hydride, for example lithium aluminum hydride, to yield the 7-aminoalkyl product.

Alternatively, the above bicyclo[4.2.0]octa-1,3,5-triene-7-carbonyl derivative is catalytically reduced in the presence of an excess of ammonia or a lower alkylamine and hydrogen with a platinum or nickel hydrogenation catalyst, to give corresponding 7-aminoalkyl or 7-monoloweralkylaminoalkyl products.

The compounds of Formula I where $n$ is 1 are prepared as shown in the following general reaction sequence illustrated for $R_1$ and $R_2$ both hydrogen:

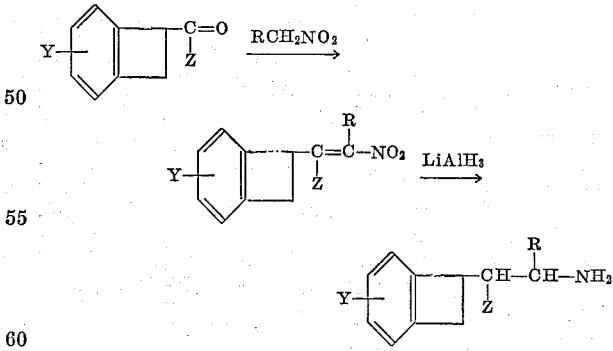

Thus, the bicyclo[4.2.0]octa-1,3,5-triene-7-carbonyl derivative is reacted with a nitroalkane in the presence of ammonium acetate to give a nitroalkene derivative which is reduced, preferably with a bimetallic hydride, for example lithium aluminum hydride, to give the 7-aminoalkyl product.

Where $n$ is 1, the N-monoloweralkyl compounds of Formula I are prepared from the corresponding primary amine as follows. The primary amine is refluxed with ethyl formate for from 12 to 24 hours and the resulting N-formyl compound is reacted with sodium amide or a suspension of sodium hydroxide or hydride in mineral oil to give the sodio derivative which is alkylated with the lower alkyl iodide to give the N-formyl-N-lower-alkylamine. Hydrolysis of this compound in hydrochloric acid solution gives the N-monoloweralkylamino compound.

Where *n* is either 0 or 1, the diloweralkylamino compounds of Formula I are prepared by exhaustive alkylation of the primary amine. For example, the dimethylamino derivatives are obtained by methylation of the primary amine with a mixture of aqueous formaldehyde and formic acid.

The appropriate bicyclo[4.2.0]octa-1,3,5-triene-7-carboxylic acid used as a starting material in these reactions is known or prepared by methods known to the art, for example by ultraviolet irradiation of a 2-diazo-1-indanone which results in ring contraction. This reaction sequence is represented as follows:

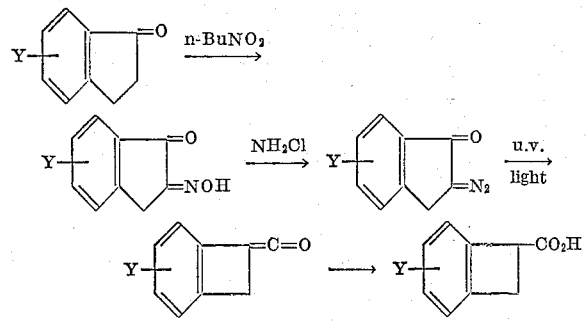

The foregoing is a general description of the main synthetic routes employed in the preparation of the compounds of this invention. Variations of these procedures will be apparent as possible to one skilled in the art. The following examples illustrate the preparation of compounds of this invention but are not to be considered as limiting the scope set forth by general Formula I.

*Example 1*

To a suspension of 1.9 g. of lithium metal in 100 ml. of dry ether, ice-cooled, is added dropwise 9.0 ml. of methyl iodide. The mixture is stirred for one and one-half hours and then at room temperature for 30 minutes. A solution of 4.0 g. of bicyclo[4.2.0]octa-1,3,5-triene-7-carboxylic acid in 100 ml. of ether is added slowly, with ice-cooling, and the mixture refluxed for six and one-half hours. The cooled reaction mixture is decomposed carefully with a small amount of methanol and water. The separated ether layer is washed with water, then saturated sodium chloride solution. The dried ether solution is evaporated in vacuo and the residue distilled to give 7-acetylbicyclo[4.2.0]octa-1,3,5-triene, B.P. 120–122° C./18 mm.

A mixture of 2.9 g. of sodium acetate, 2.44 g. of hydroxylamine hydrochloride in a small amount of water and 1.68 g. of the above 7-acetyl compound in 50 ml. of ethanol is refluxed for two hours. The reaction mixture is cooled and diluted with water to give 7-(α-hydroxyiminoethyl)bicyclo[4.2.0]octa-1,3,5-triene, M.P. 88–91° C.

To 1.1 g. of lithium aluminum hydride in 100 ml. of dry ether is added a solution of 1.1 g. of the above 7-(α-hydroxyiminoethyl) compound in 50 ml. of ether and the mixture stirred and refluxed for three hours. The reaction mixture is decomposed with 1.1 ml. of water, 1.1 ml. of 10% sodium hydroxide solution and 3.3 ml. of water, then filtered. The filtrate is evaporated in vacuo to give the residual 7-(α-aminoethyl)bicyclo[4.2.0]octa-1,3,5-triene.

A sample of the free base dissolved in ethanol is acidified with ethereal hydrogen chloride and diluted with ether to give the corresponding hydrochloride salt, M.P. 222–223° C.

*Example 2*

A solution of 33.2 g. of bicyclo[4.2.0]octa-1,3,5-triene-7-carboxylic acid chloride (prepared from the carboxylic acid by treatment with thionyl chloride) in 100 ml. of diglyme (dimethyl ether of diethylene glycol) is cooled to about −78° C. and 50.8 g. of lithium tri-t-butoxy-aluminohydride in sufficient diglyme to make 200 ml. of solution is added over a period of one hour, maintaining the same approximate temperature. The reaction mixture is then allowed to warm up to room temperature and poured onto ice. The precipitate is filtered and dried to give bicyclo[4.2.0]octa-1,3,5-triene-7-aldehyde.

A mixture of 13.2 g. of the above aldehyde, 6.1 g. of ammonium acetate and 50 ml. of nitroethane is stirred and refluxed for two hours. Excess nitroethane is removed in vacuo and the residue recrystallized from ethyl acetate-petroleum ether to give 7-(2-nitropropenyl)bicyclo[4.2.0]octa-1,3,5-triene.

A suspension of 18.9 g. of the 2-nitropropene in 200 ml. of anhydrous ether is added to a mixture of 13.2 g. of lithium aluminum hydride in 500 ml. of dry ether. The reaction mixture is refluxed for three hours, hydrolyzed and the granular precipitate filtered and washed with ether. The ether solutions are combined, dried and evaporated to give 7-(2-aminopropyl)bicyclo[4.2.0]octa-1,3,5-triene.

Treatment of the free base in ether solution with hydrogen chloride gas precipitates the hydrochloride salt.

*Example 3*

Employing the following procedure 5-chloro-1-indanone, 5-methyl-1-indanone and 5-methoxy-1-indanone are converted to the corresponding 3-chloro-bicyclo[4.2.0]octa-1,3,5-triene-7-carboxylic acid, 3-methyl-bicyclo[4.2.0]octa-1,3,5-triene-7-carboxylic acid and 3-methoxy-bicyclo[4.2.0]octa-1,3,5-triene-7-carboxylic acid, respectively:

To a solution of 0.075 m. of the 5-substituted-1-indanone in 75–100 ml. of methyl cellosolve and 20 ml. of concentrated hydrochloric acid is added with stirring, 5 ml. of n-butyl nitrite. When solid begins to separate additional n-butyl nitrite is added. After standing for 30 minutes the mixture is poured into 1 l. of cold water and the 5-substituted-2-oximino-1-indanone is removed by filtration.

To a stirred solution of 0.03 m. of the 5-substituted-2-oximino-1-indanone in a mixture of 200 ml. of water and 30 ml. of 1 N sodium hydroxide (0.03 m.) cooled in an ice bath, is added dropwise 4 ml. of 15 N ammonium hydroxide (0.06 m.) followed by 5.25% sodium hypochlorite solution (100 ml., 0.071 m.). One hour after the addition is complete the ice-bath is removed and stirring continued for five hours. The precipitated solid is filtered, washed with water and dissolved in methylene chloride. The resulting solution is treated with charcoal, filtered, concentrated and cooled to give the 5-substituted-2-diazo-1-indanone.

A solution of 0.0126 m. of the 5-substituted-2-diazo-1-indanone in 200 ml. of tetrahydrofuran and 100 ml. of water containing 2.0 g. of sodium bicarbonate is irradiated with ultraviolet light at the boiling point of the solution for ten hours. The tetrahydrofuran is removed by distillation to leave an aqueous residue which after extraction with methylene chloride is acidified and extracted with ether. The ether layer is washed with water, dried and concentrated to give the 3-substituted-bicyclo[4.2.0]octa-1,3,5-triene-7-carboxylic acid.

Following the procedure of Example 1, the above prepared 3-substituted-bicyclo[4.2.0]octa-1,3,5-triene-7-carboxylic acids are converted to the corresponding 3-chloro-7-(α-aminoethyl)bicyclo[4.2.0]octa-1,3,5-triene, 3-methyl-7-(α-aminoethyl)bicyclo[4.2.0]octa-1,3,5-triene and 3-methoxy-7-(α-aminoethyl)bicyclo[4.2.0]octa-1,3,5-triene, respectively. Thus, a suspension of 0.27 m. of lithium metal in 100 ml. of dry ether is reacted with 9.0 ml. of methyl iodide for two hours and then 0.027 m. of the 3-substituted-bicyclo[4.2.0]octa-1,3,5-triene-7 - carboxylic acid in ether is added. Decomposition of the reaction mixture and workup gives the 3-substituted-7-acetylbicyclo[4.2.0]octa-1,3,5-triene.

A mixture of 0.035 m. of sodium acetate, 0.035 m. of hydroxylamine hydrochloride and 0.0115 m. of the 3-substituted-7-acetylbicyclo[4.2.0]octa-1,3,5 - triene in ethanol is refluxed for several hours and worked up to give the 3 - substituted - 7- ( α - hydroxyiminoethyl)bicyclo[4.2.0]-octa-1,3,5-triene.

A mixture of 0.029 m. of lithium aluminum hydride and 0.007 m. of the 3-substituted-7-(α-hydroxyiminoethyl)bicyclo[4.2.0]octa-1,3,5-triene in ether is refluxed for several hours. Decomposition of the reaction mixture and workup yields the 3-substituted-7-(α-aminoethyl)bicyclo[4.2.0]octa-1,3,5-triene.

Example 4

To a mixture of 3.2 g. of acrylonitrile in 50 ml. of acetone and 20.0 g. of sodium acetate, cooled to 5° C., is added a solution of 14.5 g. of 2-chloro-4-trifluoromethylbenzene diazonium chloride (obtained by diazotization of 2-chloro-4-trifluoromethylaniline). Cupric chloride (2.5 g.) in a little water is added and the reaction mixture is allowed to come to room temperature and held there until nitrogen evolution is complete. The acetone is distilled off then and the residue extracted with ether. The washed and dried extract is evaporated to give α-chloro-β-(2-chloro-4-trifluoromethylphenyl)propionitrile. The nitrile is catalytically hydrogenated in methanol with palladium-charcoal at atmospheric pressure to yield β-(2-chloro-4-trifluoromethylphenyl)propionitrile. This nitrile is treated with excess potassium amide in ether/liquid ammonia solution to give the ring-closed 3-trifluoromethyl-bicyclo-[4.2.0]octa-1,3,5-triene-7-nitrile which is hydrolyzed with hydrochloric acid to 3 - trifluoromethyl - bicyclo[4.2.0]-octa-1,3,5-triene-7-carboxylic acid.

Following the procedure of Example 1, a suspension of 0.7 g. of lithium metal in 40 ml. of dry ether is reacted with 4.0 ml. of methyl iodide for two hours and then 2.2 g. of 3-trifluoromethyl-bicyclo[4.2.0]octa-1,3,5-triene-7-carboxylic acid in ether is added. Decomposition of the reaction mixture and workup gives 3-trifluoromethyl-7-acetylbicyclo[4.2.0]octa-1,3,5-triene.

A mixture 2.9 g. of sodium acetate, 2.4 g. of hydroxylamine hydrochloride and 2.5 g. of 3-trifluoromethyl-7-acetylbicyclo[4.2.0]octa-1,3,5-triene in ethanol is refluxed for several hours and worked up to give 3-trifluoromethyl - 7 - (α - hydroxyiminoethyl)bicyclo[4.2.0]octa - 1,3,5-triene.

A mixture of 1.1 g. of lithium aluminum hydride and 1.6 g. of 3-trifluoromethyl-7-(α-hydroxyiminoethyl)bicyclo[4.2.0]octa-1,3,5-triene in ether is refluxed for several hours. Decomposition of the reaction mixture and workup yields 3 - trifluoromethyl - 7 - (α - aminoethyl)bicyclo-[4.2.0]octa-1,3,5-triene.

Example 5

An ethanolic solution of 1.5 g. of 7-acetylbicyclo-[4.2.0]octa-1,3,5-triene is hydrogenated in the presence of 0.1 g. of platinum oxide catalyst with an excess of methylamine for four hours. Removal of the solvent after filtration yields 7-[α-(N-methylamino)ethyl]bicyclo-[4.2.0]octa-1,3,5-triene.

Example 6

A mixture of 14.6 g. of 7-acetylbicyclo[4.2.0]octa-1,3,5-triene, 6.1 g. of ammonium acetate and 50 ml. of nitroethane is stirred and refluxed for two hours. Excess nitroethane is removed in vacuo to give 7-[2-(3-nitro)-butenyl]bicyclo[4.2.0]octa-1,3,5-triene.

A solution of 20.3 g. of the 3-nitrobutene in 250 ml. of anhydrous ether is added to a mixture of 13.3 g. of lithium aluminum hydride in 500 ml. of dry ether. The reaction mixture is refluxed for three hours, hydrolyzed, filtered and washed with ether. The combined ether solutions are dried and evaporated to give 7-[2-(3-amino)-butyl]bicyclo[4.2.0]octa-1,3,5-triene.

Example 7

A 40% aqueous solution of formaldehyde (5.1 g.) is added to a cooled solution of 3.0 g. of 7-(α-aminoethyl)-bicyclo[4.2.0]octa-1,3,5-triene in 6.6 g. of 90% formic acid, and the mixture refluxed for 18 hours. The cooled reaction mixture is treated with 2.7 ml. of concentrated hydrochloric acid and the solution evaporated in vacuo. The resdue is made alkaline with 50% potassium hydroxide solution and the solution extracted with ether. The dried ether extract is evaporated to give 7-(α-dimethylaminoethyl)bicyclo[4.2.0]octa-1,3,5-triene.

Example 8

A solution of 16.1 g. of 7-(2-aminopropyl)bicyclo-[4.2.0]octa-1,3,5-triene and 100 ml. of ethyl formate is refluxed for 17 hours. The excess ethyl formate is evaporated in vacuo to leave the residual 7-[2-(N-formylamino)-propyl]bicyclo[4.2.0]octa-1,3,5-triene.

To a stirred solution of 18.9 g. of the N-formylamine in 150 ml. of diethyleneglycol dimethyl ether is added 5.2 g. of a 54.5% suspension of sodium hydride in mineral oil. The mixture is refluxed for two hours, cooled and an additional 5.2 g. of the sodium hydride suspension is added. Refluxing is continued for two hours, the mixture is cooled and 67 ml. of methyl iodide is added. The mixture is allowed to stand for 16 hours at room temperature and then refluxed for eight hours under an acetone-Dry Ice condenser. After standing an additional 72 hours at room temperature, 20 ml. of methyl iodide is added and the mixture refluxed for four hours. The reaction mixture is filtered, the filtrate concentrated to ca. 75 ml. and poured into 1 l. of ice water, and the separated oil is extracted with methylene chloride. The dried extract is evaporated and distilled in vacuo to yield 7-[2-(N-formyl-N-methylamino)propyl]bicyclo[4.2.0]octa-1,3,5-triene.

A mixture of 10.2 g. of this amine and 100 ml. of 37% hydrochloric acid is refluxed and stirred for 20 hours. The reaction mixture is extracted with ether and the aqueous portion is concentrated in vacuo. The residue is dissolved in 200 ml. of water and the solution extracted with ether. The aqueous layer is made strongly alkaline with 40% sodium hydroxide solution and the separated oil is extracted with ether. The dried extract is evaporated in vacuo to give 7-[2-(N-methylamino)propyl]bicyclo-[4.2.0]octa-1,3,5-triene.

What is claimed is:

1. A chemical compound selected from the group consisting of a free base and its salts with pharmaceutically acceptable acids, said free base having the formula:

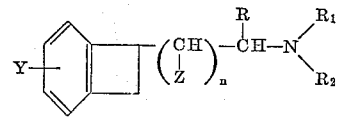

in which:

R is lower alkyl;

$R_1$, $R_2$ and Z are members selected from the group consisting of hydrogen and lower alkyl of from 1 to 3 carbon atoms;

n is a positive integer from 0 to 1; and

Y is a member selected from the group consisting of hydrogen, halogen of atomic weight less than 80, methyl, methoxy and trifluoromethyl.

2. A chemical compound of the formula:

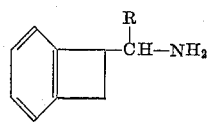

in which R is lower alkyl of 1 to 3 carbon atoms.

3. A chemical compound of the formula:

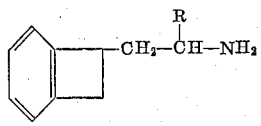

in which R is lower alkyl of 1 to 3 carbon atoms.

4. A chemical compound of the formula:

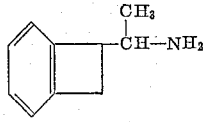

5. A chemical compound of the formula:

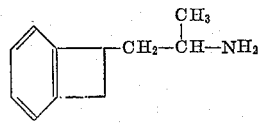

6. A chemical compound of the formula:

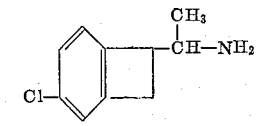

7. A chemical compound of the formula:

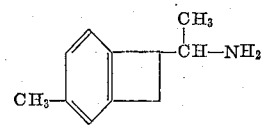

8. A chemical compound of the formula:

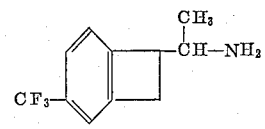

References Cited in the file of this patent
UNITED STATES PATENTS

| | | |
|---|---|---|
| 2,711,428 | Goodson et al. | June 21, 1955 |
| 2,862,034 | Hamlin | Nov. 25, 1958 |
| 3,078,307 | Craig et al. | Feb. 19, 1963 |